United States Patent [19]

Johnson

[11] Patent Number: 4,544,820

[45] Date of Patent: * Oct. 1, 1985

[54] DIE FORMING METHOD AND MACHINE

[76] Inventor: Romain H. Johnson, 925 6th St. SE., Minneapolis, Minn. 55414

[*] Notice: The portion of the term of this patent subsequent to Oct. 20, 1998 has been disclaimed.

[21] Appl. No.: 428,035

[22] Filed: Sep. 29, 1982

[51] Int. Cl.[4] .................................................. B23P 1/00

[52] U.S. Cl. ................................. 219/69 M; 76/4; 219/69 L

[58] Field of Search ................ 219/69 M, 69 E, 69 V, 219/69 R, 69 W; 51/157; 76/4; 204/129.5, 129.7, 129.1, 222, 224 M, 225

[56] References Cited

U.S. PATENT DOCUMENTS

| | | | |
|---|---|---|---|
| 163,674 | 5/1975 | McKenzie | 83/691 |
| 1,179,476 | 4/1916 | Thomas | 279/44 |
| 1,650,314 | 11/1927 | Ackermann | 83/124 |
| 1,915,080 | 6/1933 | Baumbach | 83/658 |
| 1,952,152 | 3/1934 | Wilkie | 164/94 |
| 2,773,968 | 12/1956 | Martellotti et al. | 219/69 E |
| 2,800,566 | 7/1957 | Matulaitus | 219/69 E |
| 2,924,701 | 2/1960 | Stamper | 219/69 M |
| 2,934,631 | 4/1960 | Imalis et al. | 219/69 E |
| 3,058,895 | 10/1962 | Williams | 219/69 E |
| 3,135,852 | 6/1964 | Bentley et al. | 219/69 V |

(List continued on next page.)

FOREIGN PATENT DOCUMENTS

| | | |
|---|---|---|
| 972889 | 10/1959 | Fed. Rep. of Germany . |
| 2144085 | 3/1973 | Fed. Rep. of Germany ... 219/69 M |
| 2238698 | 2/1974 | Fed. Rep. of Germany ... 219/69 M |

(List continued on next page.)

OTHER PUBLICATIONS

Brochure–"Isocut–Electro–Discharge Machining System with Three-Dimensional Servo-Control", Charmilles Erowa.
Brochure–"A New Dimension in EDM Efficiency–Operational Economy Versatility", Edimax Orbiting Head System, Edimax Inc.
Brochure–"Melting Pointers", Cerro Alloy Dept., Cerro Copper & Brass Co., vol. 4, Spring 1968, #1.
Brochure–"Danly Microme Precision Demountable Guide Posts–U.S. Pat. No. 3,219,371", Danly Machine Corp.

(List continued on next page.)

*Primary Examiner*—C. L. Albritton
*Assistant Examiner*—Geoffrey S. Evans
*Attorney, Agent, or Firm*—Burd, Bartz & Gutenkauf

[57] ABSTRACT

A method and machine for forming a complete stamping die. A material erosion machining apparatus with a movable work table assembly and an extractor is used to draw a male punch from a female die blank. The female die blank has a rough-cut die opening. The part removed from blank is a rough-cut male die punch. The die opening side walls and the rough-cut punch side walls are generally parallel and tapered in the direction of the intended die draft. The die punch fits in the rough-cut die opening of the female die blank. The work table assembly and the ram platen are moved away from each other, simultaneously with material removing electrical energy between work table assembly and extractor. One work piece is attached to work table assembly and the other work piece is attached to the extractor and, as work table assembly and extractor are moved, the die punch blank is moved through the die opening of the female die blank with the tapered side walls in opposition to the direction of movement. As this passage is made, material is removed from the female die blank and the male die punch to generate the preselected die draft, die clearance, and exact registration. A complete die set is so formed by the method and machine.

57 Claims, 14 Drawing Figures

U.S. PATENT DOCUMENTS

| | | | |
|---|---|---|---|
| 3,240,914 | 3/1966 | Hill et al. | 219/69 E |
| 3,257,306 | 6/1966 | Webb | 204/224 |
| 3,281,343 | 10/1966 | O'Connor | 219/69 E |
| 3,322,929 | 5/1967 | Mayer et al. | 219/69 M |
| 3,357,912 | 12/1967 | Inoue | 219/69 R |
| 3,498,158 | 3/1970 | Kougel | 219/69 M |
| 3,539,754 | 11/1970 | Furze et al. | 219/69 E |
| 3,600,981 | 8/1971 | Wagner | 219/69 E |
| 3,604,884 | 9/1971 | Olsson | 219/69 G |
| 3,727,489 | 4/1973 | Inoue | 219/69 E |
| 3,809,852 | 5/1974 | Weber | 219/69 V |
| 3,889,092 | 6/1975 | Hessmert | 219/69 R |
| 3,975,608 | 8/1976 | Ullmann et al. | 219/69 M |
| 3,988,863 | 11/1976 | O'Connor | 219/69 V |

FOREIGN PATENT DOCUMENTS

| | | | |
|---|---|---|---|
| 416437 | 4/1961 | Japan . | |
| 413594 | 7/1961 | Japan . | |
| 45-35115 | 11/1970 | Japan . | |
| 46-17679 | 5/1971 | Japan | 219/69 W |
| 49-54998 | 5/1974 | Japan . | |
| 51-14840 | 2/1976 | Japan . | |
| 52-92492 | 7/1977 | Japan . | |
| 53-24200 | 3/1978 | Japan . | |
| 53-55597 | 5/1978 | Japan | 219/69 W |
| 53-56797 | 5/1978 | Japan . | |
| 53-73438 | 6/1978 | Japan . | |
| 53-85597 | 7/1978 | Japan . | |
| 53-89096 | 8/1978 | Japan . | |
| 53-97698 | 8/1978 | Japan . | |
| 2042958A | 10/1980 | United Kingdom | 219/69 W |
| 150745 | 3/1961 | U.S.S.R. | 219/69 M |
| 715274 | 2/1980 | U.S.S.R. | 219/69 M |

OTHER PUBLICATIONS

R. Buchanan et al., Ed., *Tool Design*, pp. 128–139, 1943.

Krauter, "EDM & TFM, The Ideal Marriage in a Production of Die Sinking Center", SME Technical Paper, 1976.

"Utilizing EDM Potential in the Small Tool & Die Shop", SME Technical Paper, 1976.

"Sawing Hardened Steel-Omnidirectionally", *Manufacturing Engineering*, 1/1977, pp. 48, 49.

Brochure—"Electrotools, Inc.—Vibrators—Metem Uniaxial Vibrators", Electrotools, Inc.

"Reverse EDM Match Dies", *American Machinist*, 7/31/1967, p. 67.

J. Dillon et al., "Ford Engineers Appraise EDM for Making Body Dies", *Metal Progress*, 10/1967, pp. 199–200.

DIE FORMING METHOD AND MACHINE

DESCRIPTION

1. Technical Field

The invention relates to a method of making stamping dies and a machine for automatically producing a die that has a male punch aligned with a female matrix and a positive shear relief angle.

2. Background Art

The primary art involves the manufacture of shear members for press-working sheet material. The concerned art includes: Computer Aid Manufacturing (CAM); Computer, Metal Erosion Machine; Control, Adaptive; Control, Machine Tool; Dies, Contour; Dies, Emboss; Die Set; Dies, Shear; Dies, Trim; Electro-Gel Machining; Electroburnishing; Electrode Making; Electromechanical Burnishing; Electropolishing; Laser Beam Die Machining and Hardening (LBM); Machining, Electrochemical (ECM); Machining, Electrodischarge (EDM); Materials, Critical, Reduction; Matrix Forming; Molds, Generated, Wall Thickness; Orbit, Electroerosion Elipsoidal; Orbital Motion, Electroerosion; Pins, Guide, Die Set; Punch Forming; Sawing, Electrolytic; and Tooling, Lead Time, Reduction.

According to standard and accepted die making practice, the female die part and the male punch of a complete die are individually machined, heat treated, finished and mounted in a die set. Each complete die has a specified die clearance and draft. The die clearance is the measured space between the mating members of a complete die. For optimum finish of a cut edge of the work part, proper clearance is necessary and is a function of the kind, thickness and temper of the work material. Draft is the amount of taper of the side walls of the female die opening to enable a severed part to be moved through the die without excessive force. Absence of positive draft causes "stacking" or "slug-up" resulting in die failures and excessive press tonnage. Press operators have received personal injury from die failure due to improper die draft. Shattering of punches and splitting of dies are common in the industry and are generally avoided by increased positive draft. However, excess positive draft reduces the economic life of the die. Positive draft occurs when the side walls of the female die opening taper divergedly from the working face of the female die part where the punch contacts the work material. Negative draft is almost always avoided in the die manufacturing industry.

Once the complete die parts are formed with proper clearance and draft, they are mounted in a die set where it is important that proper registration is achieved. Registration is the relative alignment of the die parts in the die set so that, upon closure of the die set, the die parts will properly come together to maintain the required die clearance.

The current state of the art of die making and die fitting requires precision machining of the punch and matrix to an exact new die fit of about 5% of the stock thickness of the sheet material to be press sheared. The punch and matrix must be precision registered in a die set, as shown in U.S. Pat. No. 1,915,080. Prior to this invention, punches with a relief taper, as shown in FIG. 8 of U.S. Pat. No. 1,179,476 were thought to be best because of the greatly reduced force of withdrawal. The original advantage of a $\frac{1}{4}°$ taper on the punch yielded to the economics of straight sided punches that are made extra long for the resharpening required to remove the tendency to wear to a boat tail contour.

It is well established that a positive die shear relief angle must be provided such that the punched material is relieved of radial compressive load as it passes through the female matrix opening. Research indicates as much as a 400% productive life increase if this angle is made +0.50 degrees to +0.75 degrees per side from the axis of punching stroke.

To obtain minimum edge burr and a correct sheared edge, a 1.0 mm (0.04 in.) thick sheet of soft commercial steel requires about 6% or 0.060 mm (0.0024 in.) lateral die shear clearance per side and producing such fine machined hardened surfaces requires great skills, as is well-known in the die making trade. As another example, 0.6 mm (#24 U.S. steel gage) stock demands a 0.03 mm shear gap be maintained after die set assembly.

Making a punch and matrix mate to such precision and then mounting them to the shoes of a die set and expecting to maintain the required 0.005 mm (0.0002 in.) shear clearance is very costly and near the present limits of machine tools and artisan skill. For these reasons of cost and skill shortages, die cutting of the type revealed in U.S. Pat. No. 163,674 and as shown in U.S. Pat. No. 1,650,314, is still a common practice, despite very low productivity, infamous maintenance costs, and unacceptable operator injury liability rates. Hands are often placed under the steel rule knife blades to remove severed stock or arrange stock for the next press stroke.

U.S. Pat. No. 3,322,929 discloses a process to make dies by plunging a contour routed lamination, of a soft punch and an electrode tip, into a matrix. Both the technique of planar translation orbit and routing the electrode tip undersize seem to have been used to obtain the correct punch to matrix die clearance.

In West German Pat. No. 2,238,698, a perishable electrode tool was contemplated requiring skilled continual manual wear compensations if the correct punch to die lateral shear clearance was to be produced. Automation of punch and die alignment was not solved. West German Pat. No. 2,238,698 teaches another solution to the reverse taper problem of an EDM plunge but does not permit automation.

Due to the foregoing considerations of clearance, draft and registration, die making is a tedious, time-consuming and thus expensive procedure. More inexpensive die making techniques have been developed, but the complete die produced thereby is inferior in quality and generally usable only for short-term runs. For example, a so-called floating punch die is an inexpensive die produced where the punch and die female die part are made from the same piece of tool steel by simply cutting the punch out of the die blank and guiding with a solid type stripper.

Some new, economical die making methods have been developed with the introduction of apparatus for material erosion machining which machine by methods sometimes known as alternative metal removal processes. These include apparatus for electrical-discharge machining, electrochemical machining, ultrasonic machining, and lapping. Electrical discharge machining is based on the principle of erosion of metals by spark discharges. For example, see U.S. Pat. No. 3,604,884. The spark is a high energy transient electric discharge through the space between two charged electrodes, one of which is a tool and the other a work piece. The discharge occurs when the potential difference between the tool and the work piece is large enough to cause a breakdown in a dielectric fluid medium and to procure an electrically conductive spark channel. As the spacing between the tool and work piece is critical, the feed is generally controlled by servomechanisms.

Apparatus using electrochemical machining process uses a conducting electrolyte which dissolves the reaction products formed on the work piece by electrochemical action and also serves to flush away metallic ions migrating from the work piece. The electrolyte is pumped at high velocities between the forming tool (cathode) and the work piece (anode). A DC power supply maintains very high current densities between the tool and the work piece. For example, see U.S. Pat. No. 3,257,306.

An apparatus for ultrasonic machining and lapping employs a process where a tool is given an oscillation, which, in turn, transmits energy to fine abrasive particles that are present between the tool and the work piece. Minute particles of the work piece or oxide film are eroded away on each stroke. Aluminum oxide, boron carbide, silicon carbide, or diamond particles are typical abrasives used in a slurry, which also carries away the removed debris. This can be conjoined with electrochemistry.

As such apparatus and methods are applied to die making, in an electrical-discharge machining apparatus, for example, a die blank is fastened to one shoe of a die set and becomes the work piece. An electrode fashioned in the shape of a punch is fastened to the other shoe and is used to "burn" or erode the die opening in the die blank by bringing an electrode and the bed of the machine together. The die set in practical usage has insulated guide posts. By this method satisfactory registration can be obtained, but a negative die draft results, and die clearance is of limited range. Larger clearances and faster rates pit the surface and draw the temper from the tool steel, limiting these old methods.

Spark wire electrodischarge machining of punches and matrices or female blanks is limited by the energy that can be safely transmitted by the wire. The required surface quality limits peak voltages and kerf removal rates. The parameter of frequency is being pushed to the limit where hysteresis skin effect is a practical problem. Wire elongation is a problem. Wire resonance from magnetic effects and spark explosion-implosion produce kerf consistency problems. In deep cuts, thermal dielectric heating, combined with metallic suspended particles, produces kerf width variations. For practical tool room reasons, most shops seek a wire diameter and spark gap that produces an outside kerf radius of not much more than 0.2 mm (0.008 in.).

Metal diffusion and alloy changes take place on the cut surface and a surface tensile stress is produced combined with thermal micro-cracks. Wire feed regulation techniques are well-perfected and the presence of natural ions in the dielectric water, while producing some feed dither and minor kerf changes, seems to have little practical effect other than staining the work and producing unmeasurable electrochemical stray staining.

Ion contamination of water on a wire machine affects only the feed trajectory vector servoelectrics and has little effect on kerf width. Plunge type conventional mold sinking electrodischarge machines must use a fluid of very consistent spark break-down voltage because the most advanced low impedance transistorized ram advance servosystems are controlled by the time delay from transistor gating until the voltage peaks due to a corona that dances from heating points on the electrode surfaces. Rate and time delay are functions of the electrode gap and result in a well-perfected art of plunge regulation. The primary nuclei resonance of parafin is about 30 $MH_z$. Due to resonance and the variable dielectric area in plunge machining, and the electrochemistry of water, dielectric silicone or organic fluids provide the most practical accurate regulation. The "on time" of the sparking current must be shut off after a few milliseconds to prevent the metallic plasma constituent, stabilized by magnetic constriction, from gathering into a damaging arc between the electrodes. The plasma and electric fields are then collapsed at radio frequency resonance into spherical metallic plasmoids much like atmospheric ball-lightening. Radio frequencies are again generated from the co-operative asymmetry of the swirls and the Thomson effects. The hot plasmoids and the electric surface are then hit by a dielectric rebound implosion and solidify. The time lapse from final implosion until voltage is again applied is called the "off time".

The method of making a die of the invention is not concerned with graphite erosion and can allow corona quenching by anticipated reversed field polarity and uses the "off time" to permit a quenching potential followed by a reverse polarity "on time" for a net time savings and to control the asymmetric wear ratios of eroded surfaces.

Spark electrodischarge has poor volume removed per unit time. However, it is superior to electrochemical machining in first usage production of accurate contours. Electrochemical machining produces superior metallurgy and very practical speeds, but accurate gap control is a major problem.

U.S. Pat. No. 3,357,912 discloses a dual machining process consisting of rough electrochemical machining using less than 11.5 volts direct current to activate the electrochemical work function with a superimposed alternating current $1.0 \times 10^2$ to $1.0 \times 10^6$ Hertz per second pulse waveform. In addition to the known productivity of electrochemistry, an alternating current productivity improvement of 2.5 is mentioned. Fine finishing was done using conventional spark electrodischarge and a pure water or kerosene dielectric fluid. Polarized surface active recipes are known that claim to multiply productivity by whole integers, but they seem to have electrolyte recycling and economics of maintenance problems. In U.S. Pat. No. 2,934,631 a spark erosion takes place using an alkaline electrolyte, which confirms the explosive sputtering of the transconductive Helmholtz oxide boundary film.

The process of electrode orbit appears in West German Pat. No. 972,889. U.S. Pat. No. 3,135,852 seems to have advanced the art by providing the use of automatic eccentricity control by electric differentials to separate motors.

Circularly polarized photonic radiation can cut at least 25 mm thick tool steel at a much faster rate than any electrodischarge wire and with sufficient accuracy to generate a hardened shear contour accurate to within about +0.64 mm (0.025 in.) of the desired shear line. It is necessary to have kerf consistency. Beam guidance from a black and white template or by digital methods is possible.

A band saw moving with the correct speed and flooded with the correct liquid can be charged with a direct current and used to saw hardened tool steel at fast feeds.

DISCLOSURE OF INVENTION

The invention relates to a machine and method of producing a complete die from a female die block with a rough-cut die opening, and a rough-cut male die punch block. The male die punch block substantially corresponds in shape to the die opening and can be fitted or assembled in the die opening. Side walls of the die opening and the male die punch block are tapered generally in the direction of an intended die draft. The machine includes a material erosion machining apparatus of the type employing alternative material removal methods. Such apparatus can be comprised as an electronic discharge machine, an electrochemical machining apparatus or an abrasive machining apparatus. The apparatus has a work table or work bed and an extractor, each having means to hold a work piece. Means are provided for moving the extractor away from the work bed while providing material erosion energy discharge between them. The female die block comprises one work piece and the male die punch comprises the other. The male die punch is placed in assembled relationship to the female die block and one is assembled to the work bed while the other is assembled to the machine ram. The tapered side walls of the die opening and the male die punch are orientated in such a relationship as to be in opposition to movement of the upper ram away from the work bed. In one embodiment, a thin conductive sheet member is secured to lower surface of the punch and upper surface of the female die block to minimize burn of the cutting edges thereof during the material erosion process. The sheet serves the die maker as a geometric testament or template. Under material removing energy discharge, the male punch is drawn through the female matrix opening against the taper of the side walls whereby material is removed from the side walls of both the female matrix opening and the male punch. The amount of material removed is preselected according to the intended die clearance and die draft. Lateral motions can be introduced by servomechanisms to reduce production time, improve the finish, and control die clearance and draft. These motions are integrated with the withdrawal motion. When the operation is accomplished with the male die punch and the female die block assembled in shoes of a die set, proper die registration, die clearance, die draft, and surface quality and texture are achieved by automatic servosystems. The system is such that one operator may tend several machines.

The die making method and apparatus is employed to digitally cancel the unknown factor of the erosion drift that establishes where the shear line will occur. The remaining apparatus operating parameters relating to regulation and control are known without resorting to synthesized factor adaptive control estimates. The die making method and apparatus of the invention provides (a) positive shear relief angles, (b) die design prescribed clearance between the upper and lower shear members, (c) sharp matrix or punch corners where necessary, (d) automatic alignment or registration of the above stated die clearances such that the completed die set or punch and die retaining device requires no skillful time consuming shop metrication and assembly adjustments to re-establish the above stated die clearances prior to press room production, (e) well-established cycle time savings of roughing first, and (f) metallurgical surface improvement of roughing erosion rates proportioned to a fine finishing rate. Additionally, the preparation technique is much faster and accomplished at relatively low cost.

DESCRIPTION OF PREFERRED EMBODIMENT

Figures 1, 2:
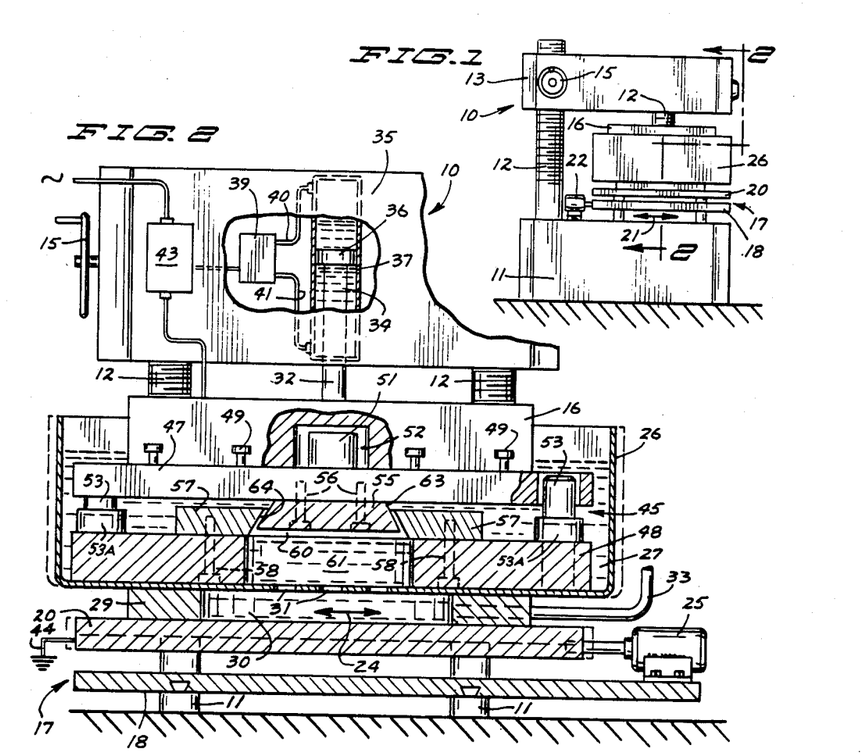
FIG. 1 is a side elevational view of one form of a die forming machine according to the present invention.
FIG. 2 is an enlarged front view of the die forming machine of FIG. 1 partly in section, taken along the line 2—2 of FIG. 1.

Referring to the drawings, there is shown in FIGS. 1 and 2 a die forming machine indicated generally at 10, according to one form of the present invention. Machine 10 has a generally C-shaped frame which includes a base 11, vertical stanchions or support columns 12, and a head 13. The vertical position of head 13 is roughly adjustable relative to base 11 on support columns 12 by suitable adjusting means. As shown, the upper portions of support columns 12 are threaded and engage threaded collars (not shown) or the like within head 13 which are rotated by manipulation of control wheel 15 to raise or lower head 13 for rough adjustment. Other adjustment means known in the art can be used.

Machine 10 includes a material erosion machining apparatus shown in the form of the invention illustrated as an electronic discharge machining apparatus. Machine 10 could as well include other forms of material erosion machining apparatus which is used to generically include also ultrasonic machining and lapping apparatus and electrochemical machining apparatus.

The term "erosion", as used herein, is defined as any process that uses, in whole or in part, electron potential or ionic transfer to effect surface material removal of a metal or metalloid. This process shall include gamma radiation emitting fluids and suspensions and suspensions of common anodic film breaking abrasives, including electrically active ceramics and glasses containing metals and/or metalloids.

The electronic discharge machining apparatus includes a ram platen 16 mounted to head 13 and a work bed or work table assembly 17 mounted on the base 11 of machine 10.

Work table assembly 17 includes means for imparting motion in a horizontal plane or X-Y motion to a work piece mounted thereon and includes a first table 18 movably mounted on base 11 and a second table 20 movably mounted on the first table 18. First table 18 is movably mounted on base 11 for movement in a first or X direction in a horizontal plane indicated by the arrow 21 in FIG. 1, by suitable means as being mounted on machine ways or the like. Movement back and forth in the X direction of first table 18 is accomplished by a first servo-unit or vibrator mechanism 22 mounted on the base 11 and connected to the first table 18. Second table 20, as shown in FIG. 2, is movably mounted on the first table 18 for movement in a second direction in a horizontal plane perpendicular to the direction of movement of table 18, or for movement in a Y direction as indicated by arrow 24. Back and forth movement of the second table 20 in the Y direction is controlled by a second servo-unit or vibrator mechanism 25. As the operation of electronic discharge machining is delicate, the use of servo-units 22 and 25 controlled by suitable servomechanisms to regulate movement of the work piece and tool is commonplace and known in the art. Servo-units 22 and 25, operating in conjunction with ram platen 16 and electrical discharge regulating equipment, move the work piece and the tool according to a preselected pattern in order to achieve proper die draft, die clearance, and surface finish. Servo-units 22 and 25 can be electric, hydraulic, or of other suitable types.

A tank 26 is mounted on the second table 20 and contains an erosion fluid 27, for example, oils or deionized fluids, as is necessary in electronic discharge machining. A vertical wall 29 disposed between the tank 26 and the second table 20 forms a chamber 30 through which dielectric fluid 27 can flow through openings or ports 31. The vertical wall 29 is often located within tank 26, but is shown outside for clarity. Ports 31 can be sealed or open, as required by the openings in lower shoe 48. A tube 33 connects the erosion fluid in chamber 30 to the exterior for filtering and recycling (not shown).

Ram platen 16 is mounted on head 13 for movement away from work table assembly 17 in a Z direction mutually perpendicular to the Z and Y motions of work table assembly 17. Ram platen 16 is fixed to a shaft 32 connected to the output rod 34 of a double-acting hydraulic cylinder assembly 35 mounted in head 13. Rod 34 is connected to a piston 36 in a cylinder 37. Hydraulic fluid is derived from a hydraulic fluid source 39 which provides hydraulic fluid to the cylinder 37 through lines 40, 41 to raise and lower the piston 36 and thus ram platen 16. Hydraulic fluid source 39 is connected to the servomechanism controls (not shown). Servo-units 22 and 25 and hydraulic cylinder assembly 35 all operate in coordination according to a predetermined and preselected machining plan, resulting in the aforesaid X, Y, and Z relative motions of the work table assembly 17 relative to ram platen 16. Suitable control responsive to punched tapes or computer data can be used to control the servo-units 22 and 25 and the operation of cylinder assembly 35 as is known in the art. A common digital mode of operation is motion of the work table assembly 17 in the X-Y horizontal plane combined with retraction of cylinder rod 32 to raise ram platen 16 in the Z direction.

Electrical power is applied to platen 16 from a suitable electrical power supply indicated at 43 with work table assembly 17 grounded to base 11 as indicated at 44 in FIG. 2.

A die set assembly 45 assembled in machine 10 includes an upper die shoe 47 and a lower die shoe 48. Upper die shoe 47 is mounted to the lower surface of ram platen 16 as by having suitable T-shaped fittings in engagement with T-slots 49 in ram platen 16. Die shoe 47 is of the type having a shank 51 for mounting in a die press, the shank 51 being accommodated in an opening 52 in ram platen 16. Lower die shoe 48 is mounted to the work table assembly 17 as by being secured at the bottom of tank 26. Other usual or preferred means of mounting the die shoes to machine 10 can be used. For example, magnetic chucking devices can be contained within ram platen 16 and beneath lower die shoe 48.

Die set assembly 45 also includes guide posts 53 of the usual type for connection and guided movement of the upper and lower die shoes during a die punching procedure. Guide post bushings 53A which would usually be present during a die punching procedure are removed or lowered after die set assembly 45 is mounted to permit X-Y movement between the upper and lower die shoes 47 and 48 and for electrical isolation during the electroerosion machining procedure of forming a die. Alternatively, a die set assembly having removable guide posts can be used. On ball bushing die sets, removing the ball cage electrically isolates the upper shoe 47 and allows relative motions in the X-Y plane.

Upper die shoe 47 carries a rough-cut male die punch 55 secured thereto by bolts 56 and comprising a first machining work piece mounted with respect to the ram platen 16. As shown, male die punch 55 functions as a cathode in an electrical discharge machining procedure, although it could as well function as an anode. Full wave control is best.

Lower die shoe 48 carries a rough-cut female die blank or matrix 57 secured thereon by bolts 58. Female die matrix 57 has a rough-cut die opening 60 disposed over a die shoe opening 61 and is comprised as a second machining work piece mounted with respect to the work table assembly 17.

Female matrix 57 and male punch 55 together form a rough-cut complete die with the male punch 55 conforming substantially to the shape of the female matrix opening so as to be able to be affixed therein. Male punch 55 has tapered side walls 63, and female matrix 57 likewise has tapered side walls 64 defining the rough-cut die opening 60. Male punch 55 can be assembled as shown in the die opening 60 with the side walls 63 parallel to the side walls 64 of female matrix 57 with the taper of the side walls orientated in opposition to movement of the ram platen 16 away from the work table assembly 17. This movement of the ram platen 16 away from the work table assembly 17 closes the gap between male punch 55 and female matrix 57 such that machining takes place on the tapered side walls 63, 64. The movement of the male punch 55 is in the direction of convergence of side walls 63, 64. The direction of taper of the female matrix side walls is the same direction but steeper than the angle of the intended taper of the positive matrix draft of relief angle of the completed die.

Figure 3:
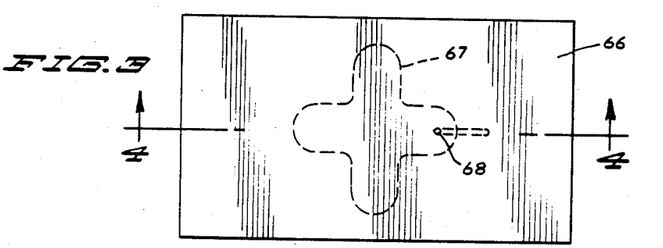
FIG. 3 is a top plan view of a blank for forming an intended die blank.
Figure 4:
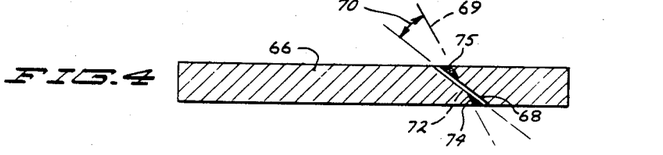
FIG. 4 is a sectional view of the blank of FIG. 3 taken along the line 4—4 thereof.
Figure 5:
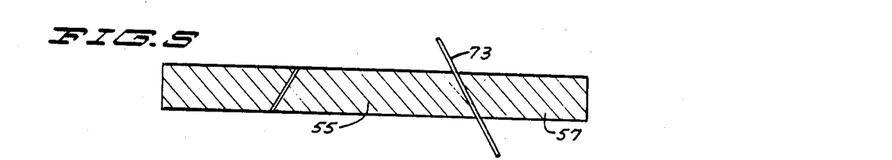
FIG. 5 is a sectional view of a rough-cut die blank showing the rough-cut female part and the rough-cut male die punch part in assembled relationship.

Male die punch 55 and female die block 57 can be separately machined to fit together as shown in FIG. 2, or they can be cut from a single blank as shown in FIGS. 3 and 4. A die blank 66 of suitable metal or other die forming material has shown in phantom at 67 the outline of the shape of the intended rough-cut die punch. A hole 68 is formed through the die blank 66 at an inclination greater than the intended side wall taper of the completed rough-cut die, which is indicated by the axis 69 in FIG. 4. This increment of inclination is indicated by the arrow 70 in FIG. 4. Hole 68 passes through the width of blank 66 and, at the approximate mid-portion thereof, intersects an imaginary downward projection of the phantom outline 67 of the intended punch shape, the intersection point being indicated at 72 in FIG. 4. Looking at FIG. 5, a suitable linear elongate cutting tool 73 is inserted through the hole 68. Cutting implement 73 is worked to a position in alignment with the axis 69 and then moved through the blank 66 to excise the rough-cut punch 67 as shown in FIG. 5. Cutting implements in common usage include the abrasive wire, wire electrical discharge machining, the electrochemical wire, the electrocontact plasma band saw, and the commmon fret or band saw blade. Other cutting methods include known energy beams, fluid and abrasive jet chamfers, plasma torch techniques, chemical and ionizing jets, and combinations of these, dependent on the required accuracy of contour 67.

In movement of the cutting means from a position in the hole 68 to a position in alignment with the axis 69, some damage occurs to die blank 66 as indicated by the stippled areas 74 and 75 in FIG. 4. The intended working surface of the male die punch is at the bottom surface of blank 66 as viewed in FIG. 4, and the working edge of the female die block is the top edge of the cut. Therefore, the damage at areas 74 and 75 is of no consequence in the final die forming procedure and is not involved in shear.

The draft angle of the wire used to cut blank 66 can be changed to alter the rough-cut angle of the gap between male punch 55 and female matrix 57. A multi-axis wire electrode cutting machine, as shown in U.S. Pat. No. 3,731,044, can be used to cut blank 66. In some dies it is required that one or more of the corners of male and female cutting edges be substantially square or sharp if the angle is other than 90 degrees. This can be accomplished by programming the controls of the wire cutting machine to provide an outwardly directed cusp or projection to an outside corner of the male punch and recess or pocket to an inside corner of the female matrix. The cusp and recess for adjacent corners are complementary in shape so that during the material erosion procedure a substantially square corner is generated.

Having so formed a rough-cut male punch and a rough-cut female matrix, either by means indicated herein or other suitable means, the work pieces are assembled in machine 10 as shown in FIG. 2, with the male punch fitted in matrix opening 60 of the female matrix 57. The tapered side walls 63 and 64 converge in a direction in opposition to or in a normally impeding relationship to movement of ram platen 16 away from work table assembly 17. For some applications, die set 45 will not be required, and male punch 55 and female matrix 57 will be mounted directly to table 20 and ram platen 16.

Figure 6:
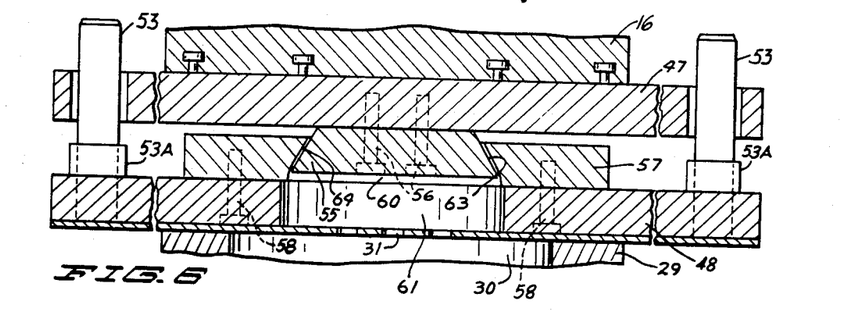
FIG. 6 is an enlarged view of a portion of the machine of FIG. 2, in section, showing commencement of a die forming procedure.

The method of forming the finished complete die is illustrated by FIGS. 2 and 6-8. In FIG. 6 the male punch 55 is positioned in the described machining apparatus to remove material from the side walls 64 which form die opening 60, at the same time as material is removed from the male die punch 55 and side wall 63 to generate proper die draft and clearance. During the machining procedure, hydraulic cylinder assembly 35 moves the male die punch 55 in an upward, or in the Z direction while the servo-units 22 and 25 impart X-Y movement or movement in a horizontal plane, to the female die block 57 to generate the proper die clearance according to a preselected programed machining plan. More specifically, again referring to FIG. 6, in the case of electrical discharge machining, an electrical discharge voltage is applied between the male punch 55 and the female matrix 57 creating an electronic envelope to discharge through the dielectric electrical discharge machining fluid 27 and resulting in a material removing erosion of the side wall surfaces 63, 64. Material is removed from both work pieces as male die punch 55 advances from a position of FIG. 6 to a position of FIG. 7 where it can be seen that proper die draft on the side wall surfaces 64 defining die opening 60 is being formed. As the male punch 55 moves in the up or Z direction, female matrix 57 is moved in the X-Y plane to remove material and generate additional die clearance according to the predetermined machining plan. The relative movement between punch 55 and matrix 57 during the entire material erosion procedure is preferably an ascending spiral having a decreasing radii and decreasing pitch. For certain other die applications, movement only in the Z direction will be sufficient and the electronic envelope surrounding the male punch 55 will suffice to generate adequate die clearance. Material removed is flushed through openings 31 of tank 26 in the dielectric fluid and is subsequently filtered out before the fluid is recirculated to the tank 26.

Figure 7:
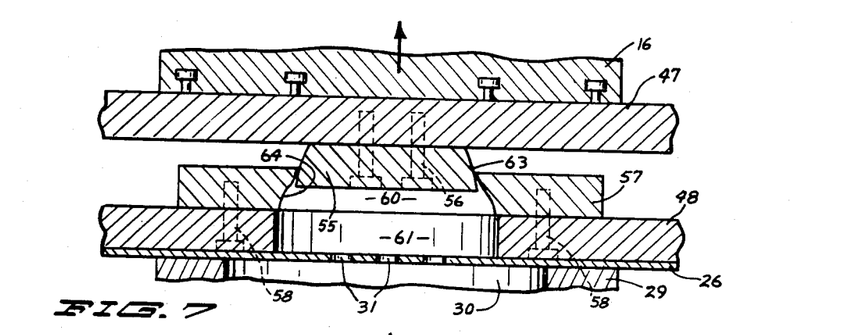
FIG. 7 is a view of the machine as shown in FIG. 6, in section, but showing the die forming procedure at an intermediate stage.
Figure 8:
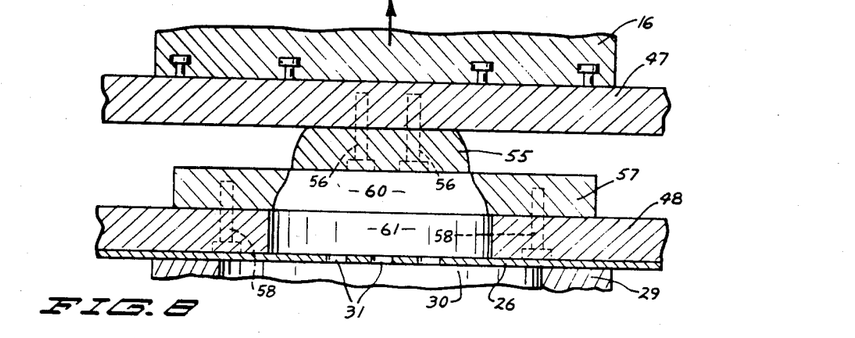
FIG. 8 is a view of the machine of FIGS. 6 and 7, in section, but showing the die forming procedure at completion.

Male die punch 55 continues to advance from the position of FIG. 7 to the position of FIG. 8 to complete the die forming procedure. The rate of material removal during the procedure depends mostly upon the average current and polarity in the electrical discharge circuit. In general, the higher material removal rate produces a rougher surface. During the initial electrical discharge machining procedure, as when going from the position of FIG. 6 to that of FIG. 7, a surface finish is not critical and the machining process may proceed very rapidly. During the final stages of machining, the machining rate slows to produce a fine surface near the upper edge of the female matrix 57 and near the lower edge of the male punch 55, which are the edges that stamp out or shear finished parts.

The positions of female die block 57 and male die punch 55 can be reversed in the machine 10 to form compound-type dies and other designs common to the tool-making trade.

After completion of the procedure, the die set guide post bushings are remounted, or the guide posts are replaced if they have been removed or pressed to an inactive position. The completed assembly mounted in the die set is ready for use. Registration or alignment is correct as the die was formed while mounted in the die set. The die has positive die draft. Die clearance is correct and is held to a close tolerance by the servomechanisms of the machine.

Figure 9:
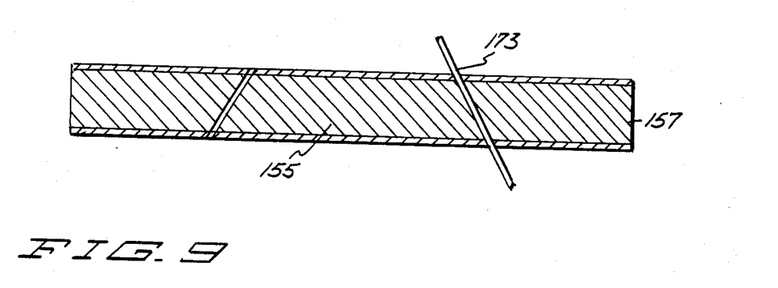
FIG. 9 is a sectional view of a modified rough-cut die blank showing the rough-cut dividing the blank into a male punch and female die blank.

FIGS. 9-13 show a modification of the method of making a die set assembly, indicated generally at 145, with machine 10. Referring to FIG. 9, there is shown a cross section of a metal blank 166 similar to blank 66 shown in FIG. 4. Blank 166 is a one-piece hardened metal, as steel, plate. The upper and lower surfaces of blank 166 are covered with separate layers or sheets 180 and 181 of electrically conductive sheet material. Sheets 180 and 181 are testament sheets. The sheet material is thin steel or graphite. Other conductive material can be used. The sheet material is attached to the upper and lower surfaces of blank 166 with thin conductive adhesive or fasteners. The sheet material can also be a removable metal layer sprayed onto the upper and lower surfaces of blank 166. The sheet material is removed from the blank after the die set assembly is completed and is useful to the die maker. Separate sheets 180 and 181 can be attached to the upper surface of matrix 157 and the lower surface of punch 155 after the punch 155 has been cut from blank 157. The sheets are cut to the shape of the surfaces and secured thereto with adhesives and the like.

Cutting tool 173 is used to make cut 174 to separate blank 166 into a rough-cut punch 155 and a rough-cut female die blank or matrix 157. Cutting tool 173 is the same as cutting tool 73 shown in FIGS. 3 and 4. Other types of cutting procedures can be used to rough-cut blank 166 to form punch 155 and matrix 157. The substantially square corners generating procedure hereinbefore described can be used in forming punch 155 and matrix 157.

Figure 10:
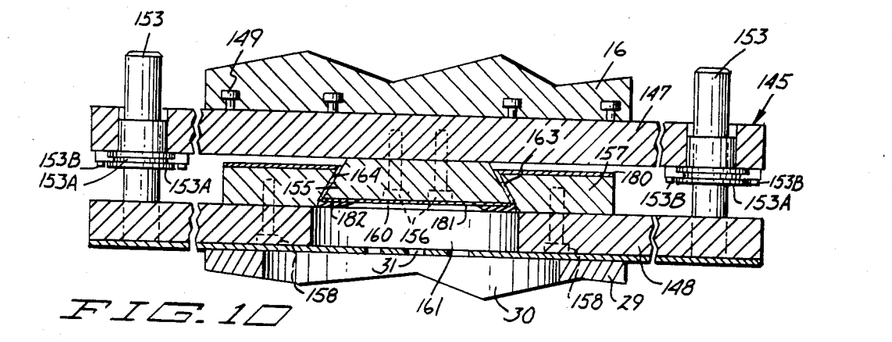
FIG. 10 is an enlarged portion of the machine of FIG. 2, in section, showing the use of a testament template and a potting compound to aid preliminary alignment.

As shown in FIG. 10, die set assembly 145 has an upper die shoe 147 and a lower die shoe 148. Upper die shoe 147 is mounted to the lower surface of ram platen 16 as by having suitable T-shaped fittings in engagement with T-slots 149 in ram platen 16. Lower die shoe 148 is mounted inside tank 26 which is secured to the work table of machine 10. Other means of mounting the die shoes to machine 10 can be used. For example, magnetic chucking devices can be contained within ram platen 16 and beneath lower die shoe 148.

Die set assembly 145 has guide posts 153 and removable bushings 153A of the usual type for connection and guided movement of the upper and lower die shoes during a die punching procedure. Screws 153B secure bushings 153A to shoe 147. Guide posts 153 and bushings 153A located in holes in shoe 147 vertically align shoe 147 with the upright axes of posts 153 so that male punch and female die blank structure secured to shoes 147 and 148 are also aligned with each other.

The rough-cut punch 155 and rough-cut blank 157 are temporarily maintained in spaced fixed relation to each other with potting compound 182. Material 182 can be dopping wax, such as lapidary cabbing dopping lac. The material 182 is placed adjacent the lower portions of side walls 163 and 164 of punch 155 and blank 157 to align punch 155 with respect to blank 157. Material 182 holds the space or gap between side walls 163 and 164 during the time the punch 155 is attached to shoe 147 and blank 157 attached to shoe 148. The punch 155 can be moved into engagement with the matrix 157 to align the punch with the matrix 157 and can be retained in this position until the punch 155 is attached to shoe 147 and the matrix 157 is attached to shoe 148. In this case, material 182 need not be used to secure punch 155 to matrix 157. Bolts or screws 158 secure blank 157 to the top of shoe 148 with die opening 160 aligned with material outlet opening 161. Bolts 156 secure punch 155 to shoe 147. The sheets 180 and 181 are removed from the surfaces of the punch 155 and blank 157 that contact shoes 147 and 148. These sheets can be retained on punch 155 and blank 157. The punch 155 can be secured to shoe 147 with other means. For example, the upper part of punch 155 can extend into a hole in a pedestal (not shown). A weld, as a beam weld, fuses punch 155 to the pedestal. The pedestal is attached with bolts to shoe 147. This attaching means is useful for small punches that cannot accommodate attaching screws.

Figure 11:
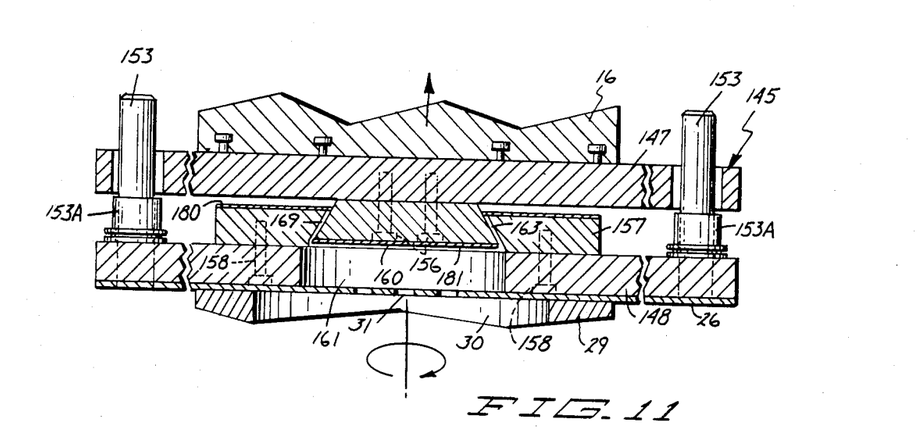
FIG. 11 is a view similar to FIG. 10, in section, showing inactive die set bushings and the commencement of the die forming procedure.

As shown in FIG. 11, bushings 153A have been removed or dropped from shoe 147. The posts 153 are spaced from shoe 147 so that the shoe 147 is electrically insulated from shoe 148. This space also permits X-Y movement between the upper and lower die shoes 147 and 148 during the procedure of forming a die. Alternatively, a die set assembly having removable guide posts can be used. On ball bushing die sets, removing the ball cage electrically isolates the upper shoe 147 and allows X-Y motions to generate die clearance.

Upper die shoe 147 carries a rough-cut male die punch 155 secured thereto by bolts 156 and comprising a first machining work piece mounted with respect to the ram platen 16. As shown, male die punch 155 functions as a cathode in an electrical discharge machining procedure, although it could as well function as an anode.

Lower die shoe 148 carries a rough-cut female die blank or matrix 157 secured thereon by bolts 158. Female blank 157 has a rough-cut opening 160 disposed over a shoe opening 161 and is comprised as a second machining work piece mounted with respect to the work table 17.

Female block 157 and male punch 155 together form a rough-cut complete die with the male punch 155 conforming substantially to the shape of opening 160 so as to be able to be assembled therein. Male punch 155 has tapered side walls 163, and female block 157 likewise has tapered side walls 164 defining the rough-cut die opening 160. Male punch 155 is assembled as shown in opening 160 with side walls 163 parallel to the side walls 164 of female block 157 with the taper of the side walls orientated in opposition to movement of the ram platen 16 away from the work table 17.

The operation of the EDM machine produces an electronic envelope or spark along with heat. The heat melts the adhesive material 182 and reestablishes the gap between punch 155 and blank 157. Movement of ram platen 16 away from work table 17, indicated by arrow 186, closes the gap between male punch block 155 and female block 157 such that the machining discharges take place on tapered side walls 163 and 164. The movement of male punch 155 is in the direction of convergence of side walls 163 and 164. The direction of taper of the side walls is the same direction but steeper than the angle of the intended taper of the positive die draft of the complete die when finished.

Male punch 155 and female block 157 can be separately machined to fit together as shown in FIG. 2, or they can be cut from a single blank as shown in FIGS. 3 and 4. As shown in FIG. 9, a die blank 166 of suitable hardened metal or other die forming material has an outline of the shape of the intended rough-cut die punch. A hole is formed through the die blank 166 at an inclination greater than the intended side wall taper of the completed rough-cut die, as indicated by the axis 69 in FIG. 4. This increment of inclination is indicated by the arrow 70 in FIG. 4. The hole passes through the width of blank 166 and, at the approximate mid-portion thereof, intersects an imaginary downward projection of the outline of the intended punch shape. A suitable linear elongate cutting tool 173 is inserted through the hole. Cutting tool 173 is worked to a position in alignment with the axis 69 and then moved through the blank 166 to cut out rough-cut die punch 167. Cutting tool 173 in common usage includes the abrasive wire, wire electrical discharge machining, and the band saw blade. Other cutting methods include energy beams, fluid and abrasive jets, plasma techniques, chemical and ionizing jets, $CO_2$ laser cutting machines, and combinations of these.

In movement of the cutting tool 173 from a position in the hole to a position in alignment with the axis, some damage occurs to die blank 166. The intended working surface of the male die punch 155 is at the bottom surface of blank 166 as viewed in FIG. 9, and the working edge of the female die block is the top edge of the cut. Therefore, the damage is of no consequence in the final die forming procedure.

Having so formed a rough-cut male punch 155 and a rough-cut female block 157, either by means indicated herein or other suitable means, and mounting punch 155 and block 157 on shoes 147 and 148, the entire disc assembly is assembled in machine 10 as shown in FIG. 2, with the male punch fitted in the die opening 160 of the female block 157. The tapered side walls 163, 164 converge in a direction in opposition to or in normally impeding relationship to movement of the ram platen 16 away from work table assembly 17. For some applications, die set 145 will not be required, and male die punch 155 and female block 157 will be mounted directly to table 20 and ram platen 16.

Figure 12:
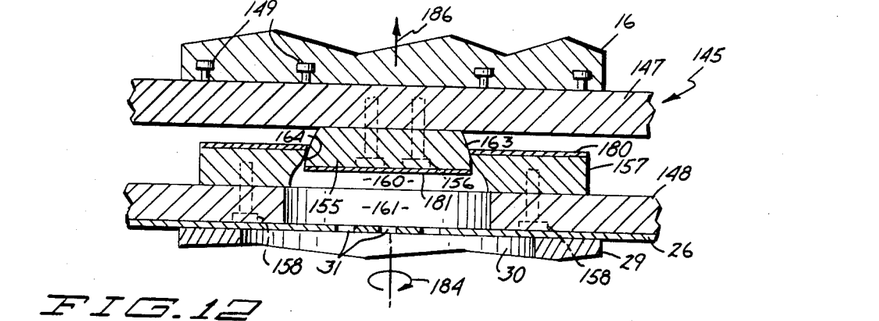
FIG. 12 is a view similar to FIGS. 10 and 11, in section, showing the die forming procedure at an intermediate state.
Figure 13:
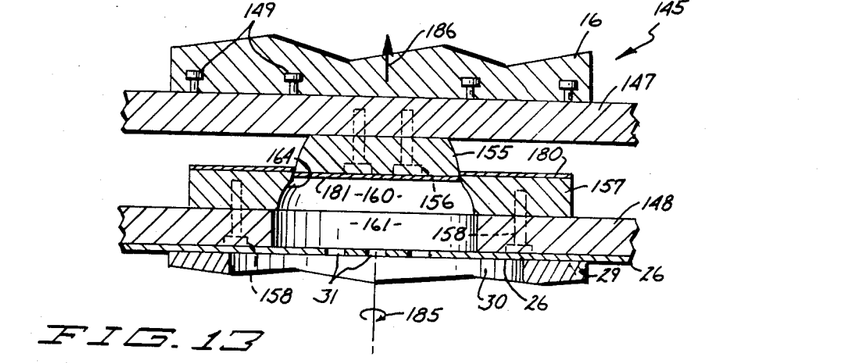
FIG. 13 is a view similar to FIGS. 10, 11, and 12, in section, showing the die forming procedure at completion.

The method of forming the finished complete die is further illustrated by FIGS. 11-13. The male punch 155 is positioned in the described machining apparatus to remove material from side walls 164 which form opening 160, at the same time as material is removed from the male punch 155 and side wall 163 to generate proper die draft and clearance. During the machining procedure, hydraulic cylinder assembly 35 moves the male punch 155 in an upward, or in the Z direction while the servo-units 22 and 25 impart X-Y movement in a horizontal plane, to the female die block 157 to generate the proper die clearance according to a preselected machining plan programed into the controls for servo-units 22 and 25. More specifically, referring to FIG. 11, an electrical discharge machining voltage is applied to male die punch 155 creating an electronic envelope to break down the electrical discharge machining fluid, melt the adhesive material 182, and result in a material removing erosion between side wall surfaces 163, 164. Material is removed from both work pieces as male punch 155 advances from a position of FIG. 11 to a position of FIG. 12 where it can be seen that proper die draft on the side wall surfaces 164 defining die opening 160 is being formed. As the male punch 155 moves in the up or Z direction, female die block 157 is moved in the X-Y plane, shown by arrows 183, 184 and 185, to remove material and generate additional die clearance according to the predetermined machining plan. The relative movement between punch 155 and matrix 157 during the entire material erosion procedure is preferably an ascending spiral having a decreasing radii and decreasing pitch. For narrow dies and certain other die applications, movement only in the Z direction will be sufficient and the electronic envelope surrounding the male punch 155 will generate adequate die clearance. Material removed is flushed through openings 31 of tank 26 in the dielectrical fluid and is subsequently filtered out before the fluid is recirculated to the tank 26.

Male punch 155 continues to advance from the position of FIG. 12 to the position of FIG. 13. The rate of material removal during the procedure depends mostly upon the average current in the electrical discharge circuit. In general, the higher material removal rate produces a rougher surface. During the initial electrical discharge machining procedure, as when going from the position of FIG. 11 to that of FIG. 12, a surface finish is not critical and the machining process may proceed more rapidly. Also, the X-Y movement of blank 157, indicated by large orbit arrow 183 in FIG. 11, can be large for greater clearance. During the final stages of machining, the machining rate is slowed to produce a fine surface near the upper edge of the female die block 157 defining die opening 160, and near the lower edge of male punch 155, which are the edges that stamp out or form finished parts. The X-Y movement of blank 157, indicated by small orbit arrow 185, is small to generate close tolerances at the cutting edges. In the final stage of machining, as shown in FIG. 13, sheets 180 and 181 produce a testament template for shop usage. The material erosion of the EDM machine 10 can continue until the sheets 180 and 181 separate from each other. The sheets 180 and 181 protect the edges of punch 155 and blank 157 from eroding to a rounded configuration and minimize burning of these edges.

The positions of female block 157 and male punch 155 can be reversed in the machine 10 to form compound-type dies and other designs common to the tool-making trade.

Figure 14:
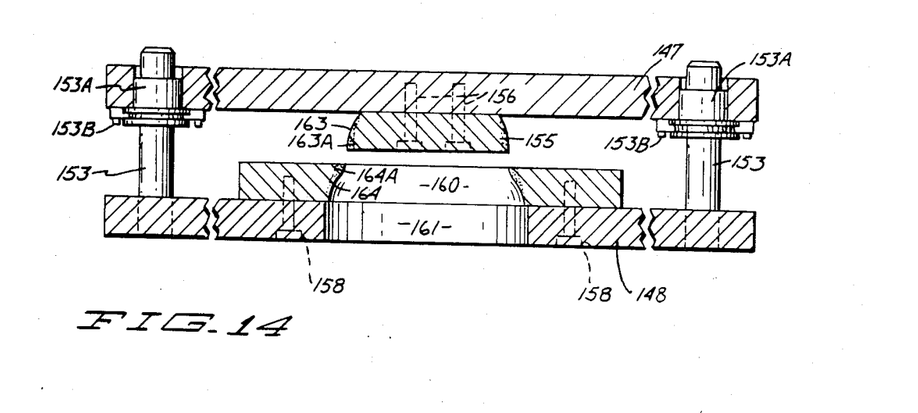
FIG. 14 is a forehsortened sectional view showing the active die set bushings of a completed die assembly.

As shown in FIG. 14, after completion of the machining procedure, the die assembly 147 is removed from machine 10 and the die set guide post bushings 153A are reassembled, or the guide posts 153 are replaced if they have been removed. The sheets 180 and 181 are removed from the punch 155 and blank 157. The complete die mounted in the die assembly is ready for use. Registration or alignment is correct as the die was formed while mounted in the die set. The die has positive die draft. The die clearances are produced by servomechanisms to tolerances superior to that of old manual skills.

The invention is directed to a punch and die with mated tapers wherein the sides are beveled divergently from the intended direction of shear press working stroke. The sides extend beyond the normal bottom press stroke position.

Subjecting the punch and matrix to controlled erosion conjointly with withdrawal of the punch relative to the die and at least one additional motion and erosion parameter, the erosion wear factors of the exact location of the shear edge will numerically cancel as the withdrawing punch reaches the approximate practical location of the press room bottom stroke position. The present art is concentrated on the metrology of two isolated parameters: (a) where the punch shear edge is located, and (b) where the die edge is located. The mated taper of the punch and die eliminates notorious variable parameters obstructing closed-loop regulated control. These parameters include spark-over gap, step motor errors, feedback errors, wire dance, flushing problems, recase problems, electrode/work ratios, inertia problems, corner trajectory problems, and great machining precision for proper die clearance.

In one generating mode, as the punch withdraws to final position, collectively each part of the punch referenced to the die location travels an ascending trajectory of a helical spiral of decreasing pitch and whose radii decreases as the punch nears the final position. Other slower polydirectional generating modes are available for specialized usage, such as smoothing and polishing and working other specialized geometries, for example, an extrusion die requiring a 0.076 mm (0.003 in.) inside corner or the proprietary polishing of carbide or similar alloys. At first, very high electrochemical or maximum electrodischarge erosion energies are used with electron direction and erosion regulation, well-known to those engineers skilled in the art. These energies reduce to fine finishing rates as the shear edges approach the final press room position, with resulting documented time savings and improved shear edges. Metrocation estimates of the variables of location, and the ratio of work to perishable electrode losses, algebraically cancel to require only regulation of the erosion gap from the X Y Z locational parameters.

The punch and matrix are simultaneously eroded as mating members. The sensed erosion gap at the final shear line plus the polar displacement for this simultaneous erosion is a numeric constant for each die, which equals the required lateral shear clearance. By withdrawing the punch relative to the matrix, positive shear relief angles are always produced. The remaining parameters, as kerf, temperature, polarity switching, erosion ratios, and erosion waveform, results in only one determinant finish, contour, and positive shear relief angle. Shop computers known to the art can store these relationships in memory and numerically control future work, as well as put these results into cathode ray tube display and tabular read-out. This permits the tool maker to always select the fastest kerf commensurate with the pressed product tolerances. It also permits the use of automated machinery for making a complete die set assembly in exact registration, optimum shear edge metallurgy, and the prescribed ideal die clearance and positive shear relief angles.

While there has been shown and described a method for making a die and a machine utilizing an electrical discharge machining apparatus, it is apparent that other forms of material erosion machining apparatus could be used, including electrochemical machining apparatus and ultrasonic machining apparatus. Furthermore, it is apparent that the X-Y movement in a vertical plane could be imparted to either the male die punch 155 or the female block 157 during the die forming process, and that movement in the Z direction could be imparted to either work piece, as well. In addition, in the case of large die clearances, an electrode can be fastened to the end of the male die punch conforming to the shape thereof, for top entry use in the material removing procedure of plunging a matrix opening. Additionally, it may be seen that a plurality of complete dies can be formed at the same time on a single machine. Other variations will be apparent to those skilled in the art without departing from the scope and spirit of the invention.

Industrial Utility

Die cutting is used by industry to cut sheet stock, such as wood veneer, paper, card stock, gasket stock, non-ferrous foil laminates, fabric, leather, and sheet plastic. In general, any of the above stated sheet stock can be cut several times faster and with less maintenance expense and accidents with a scissors-like modern shear die. Only large industries with high production volume can afford to cut these products using shear dies because the cost of shear dies is an inverse exponential of the punch to matrix lateral clearance. For example, if shear begins at 0.018 mm (0.007 in.), the required (6%) clearance is 0.011 mm (0.0004 in.) and any die maker will explain why a close clearance shear die is expensive.

The 1875 steel rule blade dieing process of U.S. Pat. No. 163,674 is still in economic usage, despite the automation of the press room. The steel rule blade has short life. Blade dieing press operators must often reach under the press ram plate to clear the cuttings. Blade dies are low in first cost and low in productivity.

The method and apparatus herein described provides an economic alternative to the steel rule blade dieing process and machine using a steel rule blade die. The method of the invention enables a machinist without special die maker skill to make a shear die having precision punch to matrix clearance with predetermined negative draft angle. The shear die can be made in a short period of time without highly skilled die makers thereby providing the die with economic efficiency of time, labor, and cost when compared with a die made by traditional die making methods.

The shear die is most advantageous for use with thin stock. The process improves the lateral practical working shear clearance accuracy of the finest precision electro-discharge wire cut dies. When more pressed product profile precision is required, die preparation by fine grinding is still available. The final punch to matrix alignment within the die set of the die set of the invention is mechanical and automatic. Much tool room and design time is now spent on the problem of exact alignment of shear members, and large dies requiring long machine tool moves and designed for thin stock are still a serious die fitting problem. The punch to matrix alignment problems have been overcome by the die making method and apparatus of the invention.

Very large dies for heavy ship vessel plate or aircraft skin contours can be generated with the die making method of the invention. Band sawing and flame hardening may be used. In all work, the die making method of the invention tends to smooth away kerf variations and requires only that the kerf be consistent with the pressed product tolerances. If the stock thickness is constant, many small dies can be placed in a large machine.

The die making method and apparatus of the invention has the further utility of being able to produce shear lines of three-dimensional contours at a great time and skill savings using simpler tool steels.

The die making data utilized in the die making method and apparatus of the invention is capable of being stored in information means, as a computer, and linked by electronic data transmission techniques to remote locations. At any instant advanced development can, in a relatively short period of time, become press production at several data linked awaiting high volume plants. This minimizes product security leakage to competitors, eliminates drafting, and allows development and quality control to be in continuum by computer aided design.

I claim:

1. A method of forming a complete die from a metal blank and a die set having an upper shoe, a lower shoe, and guide means mounting the upper shoe on the lower shoe whereby the upper shoe can be moved toward and away from the lower shoe in a linear direction comprising the steps of: severing a metal blank to form a rough-cut female die block having an opening therethrough whereby the portion of the blank defined within the opening forms a rough-cut male die punch block complementary thereto and spaced from the female block when centered therein, said severing forming adjacent rough-cut walls on said female block opening and said male block that are substantially parallel at any point therearound and tapered convergingly in the direction of intended die draft to define respective smaller and larger openings on said female block and end surfaces on said male block on either side thereof with the larger end surface of said male block greater in size than the smaller opening in the female block, said taper of the rough-cut walls being greater than the taper of the intended die draft covering the surface of the large end of the male punch block with conductive material, covering the surface of the large end of the male punch block with conductive material, covering the surface of the small end of the opening of the female die block with conductive material, securing said male block to an upper die set shoe with the larger end surface of the block spaced downwardly therefrom, securing said female block to a lower die set shoe with the smaller block opening spaced upwardly therefrom and with said female block in surrounding relation to said male block, aligning said die set shoes with said guide means for vertical relative movement in said linear direction so as to center the male block within the female block opening and with said male and female block walls in spaced relation, securing said upper die set shoe to an extractor capable of elevating said male block vertically, securing said lower die set shoe to a bed, drawing the male punch block vertically through the smaller die opening of the female die block in a direction in opposition to the taper of the side walls of the punch block and die opening while simultaneously effecting material-removing erosion between the male die punch block and the female die block to generate preselected die clearance and die draft, and removing said conductive material from said surfaces of the male punch block and female die block after the material removing erosion has been completed.

2. The method of claim 1 including: the further step of moving the female block in a direction generally normal to the direction movement of the male block during drawing thereof.

3. The method of claim 1 including: the further step of moving the lower die shoe in a direction other than the linear direction during the drawing of the male punch block.

4. The method of forming a complete die from a blank and a die set having an upper shoe, a metal lower shoe, and guide means mounting the upper shoe on the lower shoe whereby the upper shoe can be moved toward and away from the lower shoe in a linear direction comprising the steps of: severing a single metal blank to form a rough-cut female die block having an opening therethrough whereby the portion of the blank defined within the opening forms a rough-cut male die punch block complementary thereto and peripherally spaced from the female block when centered therein, said severing forming adjacent rough-cut side walls on said female die block opening and said male punch block that are substantially parallel at any point therearound and tapered convergingly in the direction of intended die draft to define respectively smaller and larger openings on said female block and end surfaces on said male block on either side thereof with the larger end surface of said male block greater in size than the smaller opening of the female block, said taper of the rough-cut walls being greater than the taper of the intended die draft covering the surface of the large end of the male punch block with conductive material, covering the surface of the small end of the opening of the female die block with conductive material, securing said male block to an upper die set shoe with the larger end surface of the block spaced downwardly therefrom, securing said female die block to a lower die set shoe with the smaller block opening spaced upwardly therefrom and said female block in surrounding relation to said male block, aligning said die set shoes with said guide means for vertical relative movement in said linear direction so as to center the male block within the female block opening and with said male and female block walls in laterally spaced relation, securing said upper die set shoe to an extractor, securing said lower die shoe to a bed, moving the male punch block and female die block relative to each other in a direction in opposition to the taper of the side walls of the punch block and die opening while simultaneously effecting material-removing erosion between the male die punch block and the female die block to generate preselected die clearance and die draft, and removing said conductive material from said surfaces of the male punch block and female die block after the material removing erosion has been completed.

5. The method of claim 4 including: the further step of moving the female block in a direction generally normal to the direction of movement of the male block during drawing thereof.

6. The method of claim 4 including: the further step of providing relative motion between the female block and male die punch block in a direction generally normal to the direction of the relative movement between the female block and male block during drawing thereof.

7. The method of claim 4 including: the further step of moving the lower die shoe in a direction other than the linear direction during the relative movement between the male punch block and female die block.

8. The method of claim 4 including: the further step of moving one of the die shoes in a direction other than the linear direction during the relative mcvement between the male punch block and female die block.

9. The method of claim 4 including: centering the male punch block in the opening of the female die block and attaching the male punch block in centered relation in said opening to the female die block before the male punch block is secured to the upper die set shoe and before the female die block is secured to the lower die set shoe, and releasing said male punch block from the female die block prior to the commencement of the material-removing erosion process.

10. The method of forming a complete die from at least one metal blank and a die set having an upper shoe, a lower shoe, and guide means aligning the upper shoe with the lower shoe whereby the one shoe can be moved toward and away from the second shoe in a linear direction normal to the parallel surfaces of said shoes, comprising the steps of: severing a metal blank to form a rough-cut female die block having an opening therethrough, said severing forming adjacent rough-cut side wall on said female die block opening, providing a rough-cut male punch block having a side wall complementary to the opening in the female die block and peripherally spaced from the female die block when centered therein, and said male punch block and female die block being tapered in the direction of intended die draft, thereby providing respectively smaller and larger openings on said female die block and proportionate surfaces on said male block, said taper of the rough-cut side walls being greater than the taper of the intended die draft, covering the surface of the large end of the male punch block with conductive material, covering the surface of the small end of the opening of the female die block with conductive material, securing said male punch block to one die set shoe with the larger end surface of said male punch block farthest from said shoe, securing said female die block to the second die set shoe with the smaller female die block opening farthermost from said second shoe and said female die block in surrounding relation to said male punch block, thus, aligning said blocks and said die set shoes parallel to said guide means resulting in centering the aforesaid male punch block within the female die block opening, and with said male and female block, said walls in laterally spaced relation to each other, securing said upper die set shoe to an erosion machine tool, securing said lower die shoe to the aforesaid machine tool, moving the male punch block relative to the female die block in the direction of convergence of the aforesai,d taper, while simultaneously effecting material-removal between the male die punch block and the female die block to generate preselected die clearance, registration, and die draft, and removing said conductive material from said surfaces of the male punch block and female die block after the material removing erosion has been completed.

11. The method of claim 10 including: the further step of moving one at least of the aforesaid blocks in a direction generally normal to the aforedescribed direction of movement of the male punch block to effect die clearance and draft angles in accordance with a plan of erosion.

12. The method of claim 10 including: the further step of providing relative motion between the female block and male die punch block with at least one motion in addition to the direction of movement of the male punch block to generate the selected die clearance and positive die draft.

13. The method of claim 10 including: the further step of moving one shoe relative to the other shoe in a helical trajectory of decreasing radii to effect die clearance and draft according to a scheme of generation.

14. The method of claim 10 including: the further step of moving at least one of the die shoes in any combination of linear and curvilinear directions culminating in the same final relative positions of the male and female die blocks to generate die clearance and shear relief angles in accordance with a mechanical scheme of production.

15. The method of claim 10 including: centering the male punch block in the opening of the female die block and attaching the male punch block in centered relation in said opening to the female die block before the male punch block is secured to the one die set shoe and before the female die block is secured to the second die set shoe, and releasing said male punch block from the female die block prior to or during the commencement of the material-removing abrasion or erosion process.

16. The method of claim 10 wherein: the rough-cut male punch block is excised from a single plate that provides the female die block.

17. The stxucture for forming a complete die comprising: a rough-cut female die block having a rough-cut die qpening, a rough-cut male punch block corresponding in shape to the die opening in the female die block, said punch block being the plug formed in making the rough-cut die opening, said punch block and die opening in the female die block having adjacent rough-cut side walls substantially parallel to each other and convergingly tapered in a direction corresponding to the taper of the intended die draft of the complete die to define respective smaller and larger end surfaces on said male punch block and openings in said female die block, first electrical conductive means attached to the larger end surface of said male punch block and second electrically conductive means attached to a portion of the female die block having the small opening, said taper of the rough-cut side walls being greater than the taper of the intended die draft, a bed, a movable extractor vertically adjustably mounted above the bed, a first die set shoe holding the punch block, said first die shoe being attached to the extractor, a second die shoe being attached to the extractor, a second die set shoe holding the female die block, means for mounting the second die shoe on said bed, locating means adapted to position the female die block in a proper die set alignment with the male die punch block with the male die punch block in registration with the female die block and with respective said side walls thereof in spaced relationship and with the converging taper of the side walls in position to block movement of the extractor away from said bed, said locating means including a plurality of axially aligned registering pins and openings on said first and second die shoes, respectively, with said pins parallel to each other, means moving the extractor away from the bed in a direction parallel to said pins, and means for material-removing erosion cooperatively associated with said blocks and operable to form the complete die set walls in the female and male blocks, said erosion means operable simultaneously with the movement of the punch block out of the opening in the female die block to remove material between the side walls of the female die block opening and the punch block to generate an intended die clearance and die draft.

18. The structure of claim 17 including: means for moving one of the die shoes in a direction other than the direction of movement of the extractor to provide relative motions between the male die punch block and female die block to control the intended die clearance.

19. The structure of claim 17 including: means for moving the second die shoe in a direction other than the direction of movement of the extractor to provide relative motions between the male die punch block and female die block to control the intended die clearance.

20. The structure of claim 17 including: means for moving at least one of the die shoes in a direction other than the axial direction of the pins to control the intended die clearance.

21. The structure of claim 17 wherein: said means mounting said second die shoe on said bed includes a movable table, and means controllably moving said table in a plane normal to the direction of extractor movement.

22. The structure of claim 17 wherein: said material-removing erosion means is an electrical discharge machine including an electrode, power control means for regulating the power supplied to the electrode, control means for said extractor, control means for said table, and machine control means for programming the power control means, extractor and table control means in a predetermined manner during erosion removal of a material from said blocks.

23. The structure of claim 22 including: a tank containing a liquid, said male and female blocks being disposed in said tank and in said liquid.

24. The structure of claim 17 wherein: said material-removing erosion means is an electrical discharge charge machine including an electrode connected to the male block, a power supply connected to the electrode, and power control means for regulating the power supplied to the electrode.

25. The structure of claim 17 wherein: said means for material-removing erosion is an electrical discharge machine including a first electrode connected to the male block, a second electrode connected to the female block, a tank containing a liquid, and with said female block being disposed in said tank and in said liquid.

26. The structure for forming a complete die comprising: a rough-cut metal female die block having a rough-cut die opening, a rough-cut metal male punch block corresponding in shape to the die opening in the female die block, said male punch block and die opening in the female die block having adjacent rough-cut side walls substantially parallel to each other and convergingly tapered in a direction corresponding to the taper of the intended die draft of the complete die to define respective smaller and larger end surfaces on said male punch block and the opening in said female die block, first electrical conductive means attached to the larger end surface of said male punch block and second electrically conductive means attached to said end surface of the female die block having the small opening, said taper of the rough-cut side walls being greater than the taper of the intended die draft, a bed and extractor mounted above the bed, a first die set shoe holding the male punch block, said first die shoe being attached to the extractor, a second die shoe holding the female die block, means for mounting the second die shoe on said bed, said first and second die shoes having cooperating die locating means to movably mount the first shoe on the second shoe for locating the male punch block in registration with the female die block with the respective side walls thereof in laterally spaced relationship and with the converging taper of the side walls in position to block separation movement of the extractor and bed, means for providing relative movement between the extractor and bed in the axial direction of the locating means, and means for material-removing erosion cooperatively associated with said male and female blocks and operable to form the complete die side walls of the female and male blocks, said erosion means operable simultaneously with the relative mcvement of the male die punch block out of the opening of the female die block to move material from between the side walls of the female die block opening and the male punch block to generate an intended die clearance and die draft.

27. The structure of claim 26 including: means for moving one of the die shoes in a direction other than the direction of movement of the extractor to provide relative motion between the male die punch block and female die block to control the intended die clearance.

28. The structure of claim 26 including: means for moving the second die shoe in a direction other than direction of movement of the extractor to provide relative motion between the male die punch block and female die block to control the intended die clearance.

29. The structure of claim 26 including: means for moving at least one of the die shoes in a direction other than the axial direction of the locating means to control the intended die clearance.

30. The structure of claim 26 wherein: said means mounting said second die shoe on said bed includes a movable table, and means controllably moving said table in a plane normal to the relative movement between the extractor and bed.

31. The structure of claim 26 wherein: said material-removing erosion means is an electric discharge machine including an electrode connected to the male block, a power supply connected to the electrode, power control means for regulating the power supplied to the electrode, control means for said extractor, control means for said table, and machine control means for coordinating the power control means, extractor and table control means in a predetermined manner during erosion removal of material from said blocks.

32. The structure of claim 31 wherein: said means for material-removing erosion is an electrical discharge machine including an electrode connected to the male block, an electrode connected to the female block, a tank containing a liquid, with said female block being disposed in said tank and in said liquid.

33. The structure of claim 26 wherein: said material-removing erosion means is an electrical discharge machine including an electrode connected to the male block, a power supply connected to the electrode, and power control means for regulating the power supply to the electrode.

34. The structure of claim 26 including: electrical conductive means attached to said large end surface of the male punch block and the end surface of the small opening of the female die block.

35. The structure of claim 28 wherein: the conductive means comprise metal sheets attached to the male punch block and female die block.

36. A machine, for forming a complete die from a rough-cut metal female die block with a rough-cut die opening and a rough-cut metal male die punch block generally corresponding in shape to the die opening of the female die block and insertable therein, said male die punch block and the die opening of the female die block having adjacent side surfaces substantially parallel and tapered in a direction corresponding to the taper of the intended correct die draft, said machine comprising: a bed, a work table assembly mounted on the bed for mounting a first work piece, controlled means operatively connected to the work table assembly for moving the work piece in controlled selected directions, an extractor, means on the extractor for mounting a second work piece wherein said female die block comprises one of said work pieces and male die punch block comprises the other of said work pieces, means for moving said bed and extractor away from one another, said work table assembly and extractor being relatively positionable with said work pieces mounted thereon so that the male punch block is located in the die opening of the female punch block with said side surfaces orientated in clearing relationship and with the diverging taper of said side surfaces orientated in position in opposition to movement of the extractor away from the work table assembly, means for material removing erosion discharge between the work table assembly and the extractor simultaneously as the work table assembly and extractor are selectively moved away from one another with the work pieces mounted thereon and the work table assembly is moved in the controlled selected directions thereof whereby material is removed between the side surfaces of the female die block opening and the male die punch block to generate an intended die clearance and die draft.

37. The machine of claim 36 wherein: the work table assembly includes a movable table having means adapted to mount said first work piece, and said control means being connected to the table for reciprocating the table in a plane normal to the direction of movement of the work table assembly and extractor away from one another.

38. The machine of claim 36 wherein: the work table assembly comprises a first table movably mounted for movement in a first direction, and a second table movably mounted on the first table for movement in a second direction normal to the first direction, and said controlled means includes first means connected to the first table for reciprocating the first table in the first direction, and second means connected to the second table for reciprocating the second table in the second direction, said first and second direction being normal to the direction of movement of the work table assembly and extractor away from one another.

39. The machine of claim 36 wherein: the machine is an electrical discharge machine, said means for material erosion removing discharge including an electrode connected to the second work piece, and said work table assembly having a tank containing a dielectric liquid, said first work piece being located in and mounted on said tank and in said liquid.

40. The machine of claim 39 wherein: said table assembly includes a movable table supporting the tank, and means connected to the table operable to reciprocate the table in a plane normal to the direction of movement of the table assembly and extractor away from one another.

41. The machine of claim 39 wherein: the table assembly includes a first table movably mounted for movement in a first direction and a second table movably mounted on the first table for movement in a second direction normal to the first direction, and said controlled means selectively recoprocating said first and second tables in said first and second directions.

42. The machine of claim 41 wherein: said controlled means for selectively reciprocating said first and second tables includes a first servo-unit drivably connected to the first table and operable to move the first table and second table, and a second servo-unit drivably connected to the second table and operable to move the second table independent of the first table.

43. The machine of claim 36 wherein: the machine is an electrical discharge machine, said means for material erosion removing discharge including an electrode connected to the second work piece, a power supply connected to the electrode, power control means for regulating the power supplied to the electrode, and control means for controlling the movement of the work table assembly extractor away from one another, and said work table assembly for including a table movably mounted on the bed, said controlled means including motor means connected to the table for reciprocating said table, and machine control means for coordinating the power control means, control means and motor means in a predetermined manner during the removal of material from the adjacent side surfaces of female die block opening and male die punch.

44. The machine of claim 43 wherein: said means on the work table assembly includes a second table movably mounted on the first table, said controlled means including a second motor means connected to the second table for reciprocating said second table, said machine control means operable to coordinate the operation of the first motor means and second motor means in a predetermined manner during the removal of material from the adjacent side surfaces of female die block opening and male die punch.

45. The machine of claim 36 wherein: the controlled means is operable to move the work table assembly in a plane perpendicular to the direction of movement of the extractor away from the work table assembly during movement of the extractor away from the work table assembly.

46. The machine of claim 45 wherein: the work table assembly includes a movable table, said controlled means being connected to the table for selective reciprocation of the table.

47. A machine for forming a complete die from a rough-cut metal female die block having a rough-cut die opening, a rough-cut metal male die punch block corresponding in shape to the die opening in the female die block, said punch block being the plug formed in making the rough-cut die opening in said female block, said male die punch block and die opening in the female die block having adjacent rough-cut side walls substantially parallel to each other and convergingly tapered in a direction corresponding to the taper of the intended die draft of the complete die to define respective smaller and larger end surfaces on said male block and the opening in said female block, said taper of the rough-cut side walls being greater than the taper of the intended die draft, a first die set shoe holding the male die punch block, a second die set shoe holding the female die block, said first and second die shoes having cooperating die locating means including a plurality of axial registering pins and openings axially aligned with the pins adapted to receive bushings to movably mount the first shoe on the second shoe for locating the male die punch block in registration with the female die block with the respective side walls thereof in laterally spaced relationship and with the converging taper of the side walls in position to block separation movement between the first and second die shoes comprising: a bed, a work table assembly movably mounted on the bed, means for mounting the second die shoe on the work table assembly, controlled means operatively connected to the work table assembly for moving the work table assembly and second die shoe mounted thereon in controlled selected directions, an extractor, means for mounting the first die shoes on the extractor, means for providing relative movement between the extractor and work table assembly in the axial direction of the pins, and means for material-removing erosion cooperatively associated with said extractor and work bed assembly and the male and female blocks mounted thereon and operable to form the complete die side walls of the female and male blocks, said erosion means operable simultaneously with the operation of the means for providing relative movement between the extractor and work table assembly and said controlled means whereby on relative movement of the male die punch block out of the opening of the female die block material from between the side walls of the female die block opening and the male die punch block is removed to generate an intended die clearance and die draft.

48. The machine of claim 47 wherein: the work table assembly includes a movable table having means adapted to mount said first die set shoe, and said control means being connected to the table for reciprocating the table in a plane normal to the direction of movement of the work table assembly and extractor away from one another.

49. The machine of claim 47 wherein: the work table assembly comprises a first table movably mounted for movement in a first direction, and a second table movably mounted on the first table for movement in a second direction normal to the first direction, and said controlled means includes first means connected to the first table for reciprocating the first table in the first direction, and second means connected to the second table for reciprocating the second table in the second direction, said first and second direction being normal to the direction of movement of the work table assembly and extractor away from one another.

50. The machine of claim 47 wherein: the machine is an electrical discharge machine, said means for material erosion removing discharge including an electrode connected to the second die set shoe, and said work table assembly having a tank containing a dielectric liquid, said first die set shoe being located in and mounted on said tank and in said liquid.

51. The machine of claim 50 wherein: said table assembly includes a movable table supporting the tank, and means connected to the table operable to reciprocate the table in a plane normal to the direction of movement of the table assembly and extractor away from one another.

52. The machine of claim 50 wherein: the table assembly includes a first table movably mounted for movement in a first direction and a second table movably mounted on the first table for movement in a second direction normal to the first direction, and said controlled means selectively reciprocating said first and second tables in said first and second directions.

53. The machine of claim 52 wherein: said controlled means for selectively reciprocating said first and second tables includes a first servo-unit drivably connected to the first table and operable to move the first table and second table, and a second servo-unit drivably connected to the second table and operable to move the second table independent of the first table.

54. The machine of claim 47 wherein: the machine is an electrical discharge machine, said means for material erosion removing discharge including an electrode connected to the second die set shoe, a power supply connected to the electrode, power control means for regulating the power supplied to the electrode, and control means for controlling the movement of the work table assembly extractor away from one another, and said work table assembly for including a table movably mounted on the bed, said controlled means including motor means connected to the table for reciprocating said table, and machine control means for coordinating the power control means, control means and motor means in a predetermined manner during the removal of material from the adjacent side surfaces of female die block opening and male die punch.

55. The machine of claim 54 wherein: said means on the work table assembly includes a second table movably mounted on the first table, said controlled means including a second motor means connected to the second table for reciprocating said second table, said machine control means operable to coordinate the operation of the first motor means and second motor means in a predetermined manner during the removal of material from the adjacent side surfaces of female die block opening and male die punch.

56. The machine of claim 47 wherein: the controlled means is operable to move the work table assembly in a plane perpendicular to the direction of movement of the extractor away from the work table assembly during movement of the extractor away from the work table assembly.

57. The machine of claim 56 wherein: the work table assembly includes a movable table, said controlled means being connected to the table for selective reciprocation of the table.

* * * * *